US006741972B1

(12) United States Patent
Girardi et al.

(10) Patent No.: US 6,741,972 B1
(45) Date of Patent: May 25, 2004

(54) METHOD AND APPARATUS FOR DYNAMICALLY DETERMINING A PRINTING LOCATION IN A DOCUMENT FOR A POSTAGE INDICIA

(75) Inventors: Victor Girardi, Oxford, CT (US); Michael Kelley, Woodinville, WA (US); Paul A. Kovlakas, Milford, CT (US); Allen L. Kramer, Middletown, CT (US)

(73) Assignee: Pitney Bowes Inc., Stamford, CT (US)

(*) Notice: Subject to any disclaimer, the term of this patent is extended or adjusted under 35 U.S.C. 154(b) by 508 days.

(21) Appl. No.: 09/187,897

(22) Filed: Nov. 6, 1998

(51) Int. Cl.[7] .......... G06F 17/60

(52) U.S. Cl. .......... 705/408; 705/401; 705/410

(58) Field of Search .......... 705/401, 408, 705/410, 411

(56) References Cited

U.S. PATENT DOCUMENTS

| | | | | |
|---|---|---|---|---|
| 3,602,114 A | | 8/1971 | Peters | 493/1 |
| 4,022,457 A | | 5/1977 | Marin | 493/399 |
| 4,701,233 A | | 10/1987 | Beck et al. | 156/217 |
| 4,835,544 A | | 5/1989 | Winterburn | 348/1.1 |
| 4,862,386 A | | 8/1989 | Axelrod et al. | 707/507 |
| 4,900,391 A | | 2/1990 | Mandel et al. | 156/364 |
| 5,006,195 A | | 4/1991 | Martin | 156/442.1 |
| 5,398,867 A | | 3/1995 | Murphy | 229/69 |
| 5,554,094 A | | 9/1996 | Viens | 493/421 |
| 5,606,507 A | * | 2/1997 | Kara | 705/408 |
| 5,628,249 A | | 5/1997 | Cordery et al. | 101/91 |
| 5,645,214 A | | 7/1997 | Taganas | 229/313 |
| 5,684,706 A | * | 11/1997 | Harman et al. | 364/464.16 |
| 5,717,597 A | | 2/1998 | Kara | 364/464.18 |
| RE35,791 E | | 5/1998 | Volz | 283/71 |
| 5,781,438 A | | 7/1998 | Lee et al. | 705/404 |
| 5,801,944 A | | 9/1998 | Kara | 705/401 |
| 5,873,073 A | * | 2/1999 | Bresnan et al. | 705/410 |
| 6,029,883 A | * | 2/2000 | Henchinger et al. | 229/71 |

FOREIGN PATENT DOCUMENTS

| | | |
|---|---|---|
| CA | 2159542 | 8/1995 |
| CA | 2266644 | 2/1997 |
| CA | 2225443 | 4/1997 |
| CA | 1306812 | 3/1998 |
| CA | 2243763 | 7/1998 |
| EP | 0 371 705 A1 * | 6/1990 |
| EP | 0741374 A2 | 2/1995 |
| EP | 0903699 A1 | 9/1997 |

OTHER PUBLICATIONS

Anonymous, "E–Stamp Corporation Brings Digital Stams to PCs Via the Internet", Business Wire, Dialog File 621:New Product Announcements, May 5, 1997.*

Metzner, Kermit, "Modern Office Mailing Equipment Brings Savings", Office Systems, vol. 10, No. 9, pp. 40–44. Sep. 1993.*

Rieck, Dean, "Great Letters and Why They Work", Direct Marketing, vol. 61, No. 2, pp. 20–24, Jun. 1998.*

* cited by examiner

*Primary Examiner*—John W. Hayes
(74) *Attorney, Agent, or Firm*—Steven J. Shapiro; Angelo N. Chaclas

(57) ABSTRACT

A processor based postage metering system includes structure for entering user input data including a fold configuration selected from a plurality of fold configurations; apparatus for accounting for postage dispensed by the processor based postage metering system; a document program running on the processor based postage metering system, the document program operable for controlling creation of a document based on the user input data; structure for automatically determining based on the fold configuration a designated location within the document for printing evidence of postage; and structure for printing the document and the evidence of postage such that the evidence of postage is printed in the designated location of the documentd. A method incorporates the functions of the apparatus.

9 Claims, 5 Drawing Sheets

METHOD AND APPARATUS FOR DYNAMICALLY DETERMINING A PRINTING LOCATION IN A DOCUMENT FOR A POSTAGE INDICIA

FIELD OF THE INVENTION

The present invention relates generally to value printing systems and, more particularly, to postage metering systems which dynamically determine the printing location of postage indicia on a document.

BACKGROUND OF THE INVENTION

Since the issuance of U.S. Pat. No. 1,530,852 to Arthur H. Pitney, the postage meter has evolved from completely mechanical postage meters to meters that incorporate extensive use of electronic components. Although postage meters have performed satisfactorily in the past, and continue to perform satisfactorily, with the advancement in computer controlled digital printing technology the United States Postal Service (USPS) and other Posts are considering requirements for new technology metering devices.

The USPS is presently considering requirements for two metering device types: closed systems and open systems. In a closed system, the system functionality is solely dedicated to metering activity. Examples of closed system metering devices, also referred to as postage evidencing devices (PEDs), include conventional digital and analog postage meters wherein a dedicated printer is securely coupled to a metering or accounting function. In a closed system, since the printer is securely coupled and dedicated to the meter, printing cannot take place without accounting. Recently, Pitney Bowes Inc. has introduced the PostPerfect® and Personal Post Office™ meters which are new closed system metering devices that include a dedicated digital printer securely coupled to a secure accounting module.

In an open system, the printer is not dedicated to the metering activity thereby freeing system functionality for multiple and diverse uses in addition to the metering activity. Examples of open system metering devices include personal computer (PC) based devices with single/multi-tasking operating systems, multi-user applications and digital printers. An open system metering device is a PED with a non-dedicated printer that is not securely coupled to a secure accounting module. Examples of PC based open metering systems are described in U.S. Pat. Nos. 5,781,438 and 5,801,944 which are each incorporated herein by reference.

When a PED prints a postage indicia on a mailpiece, the accounting register within the PED must always reflect that the printing has occurred. Postal authorities generally require the accounting information to be stored within the postage meter in a secure manner with security features that prevent unauthorized and unaccounted for postage printing or changes in the amounts of postal funds stored in the meter. In a closed system, the meter and printer are integral units, i.e., interlocked in such a manner as to ensure that the printing of a postage indicia cannot occur without accounting.

Since an open system PED utilizes a printer that is not used exclusively for printing proof of postage payment, additional security measures are required to prevent unauthorized printing evidence of postage payment. Such security measures include cryptographic evidencing of postage payment by PEDs in the open and closed metering systems. The postage value for a mailpiece may be encrypted together with other data to generate a digital token. A digital token is encrypted information that authenticates the information imprinted on a mail piece including postage values. Alternatively, the United States Postal Service has proposed utilizing public key cryptography to print a bar coded encrypted message on the mailpiece which message can be verified by the postal authority to establish the authenticity of the mailpiece. The combination of the printed postal indicia together with the encrypted information (whether a digital token or a bar coded encrypted message) is referred to as a postal revenue block.

Digital tokens and bar code encrypted messages may be utilized in both open and closed metering systems. However, for open metering systems, the non-dedicated printer may be used to print other information in addition to the postal revenue block and may be used in activity other than postage evidencing. In an open system PED, addressee information is included in the postal data which is used in the generation of the digital tokens. Such use of the addressee information creates a secure link between the mailpiece and the postal revenue block and allows unambiguous authentication of the mail piece.

The previously mentioned publication, U.S. Pat. No. 5,801,944, describes a PC based open metering system that provides the capability of merging an accounted for postal revenue block into another document (such as a letter on 8.5 by 11 inch paper) so that the letter is printed with the postal revenue block thereon in the upper right hand corner. U.S. Pat. No. 5,801,944 describes that the document with postal revenue block can then be folded in a manner such that the postal revenue block can be viewed through a window of a windowed envelope upon the insertion of the document into the envelope. This feature provides the advantage that in high speed mailing systems the separate step of printing a postal revenue block on the envelope after the document has been inserted therein is no longer required. Moreover, if the destination address is printed on the document in relation to the postal revenue block such that after folding of the document the destination address can be seen through another window of the envelope, the further step of matching an addressed envelope to its corresponding document is also eliminated.

Despite the advantages of the technology set forth in U.S. Pat. No. 5,801,944, the only described embodiment therein assumes that the postal revenue block will be printed at the top right hand corner of the document and then the document is folded appropriately so that the postal revenue block is visible through the envelope window. Thus, the location of the postal revenue block mandates that only a limited number of type folds can be used in order ensure that the postal revenue block is visible upon its insertion in the envelope. In today's environment, however, there are various ways that documents can be folded including Z-folds, C-folds, and half-folds. Moreover, within each of the fold types set forth above, there are different ways in which the particular type fold is created that will directly impact exactly at what location on the printed side of the document that the printed indicia or postal revenue block must be printed in order to be used within a windowed envelope or as a self-mailed product. Accordingly, the prior art devices are limited in that they do not dynamically account for the type of fold the document will be subjected to as an input in determining the printing location of the postage indicia or postage revenue block within the document.

SUMMARY OF THE INVENTION

It is thus an object of the invention to provide a system and method for dynamically determining a location within a document where an indicia or postal revenue block is to be printed based on the type of fold the document will be subjected to and for printing such indicia or postal revenue block in the determined location.

This object is met by providing a processor based postage metering system including structure for entering user input data including a fold configuration selected from a plurality of fold configurations; apparatus for accounting for postage dispensed by the processor based postage metering system; a document program running on the processor based postage metering system, the document program operable for controlling creation of a document based on the user input data; structure for automatically determining based on the fold configuration a designated location within the document for printing evidence of postage; and apparatus for printing the document and the evidence of postage such that the evidence of postage is printed in the designated location of the document. A method incorporates the functions of the apparatus.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DETAILED DESCRIPTION OF THE PREFERRED EMBODIMENTS

Figure 1:
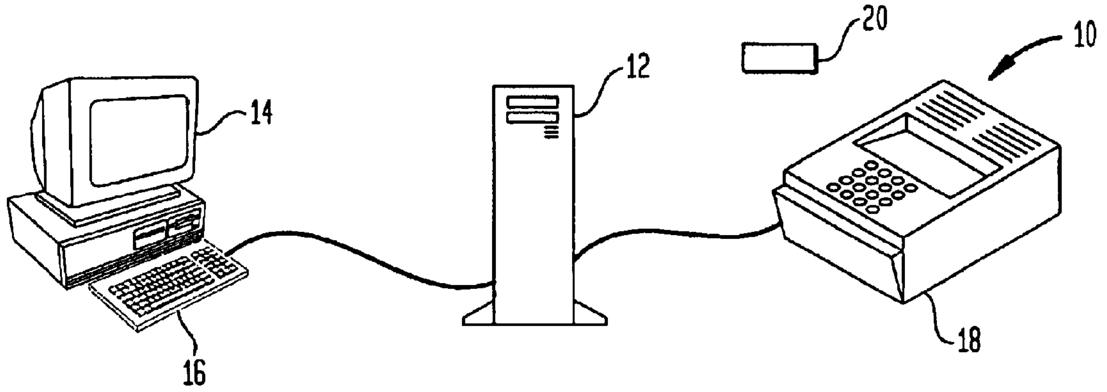
FIG. 1 shows the inventive postage metering system.
Figure 2:
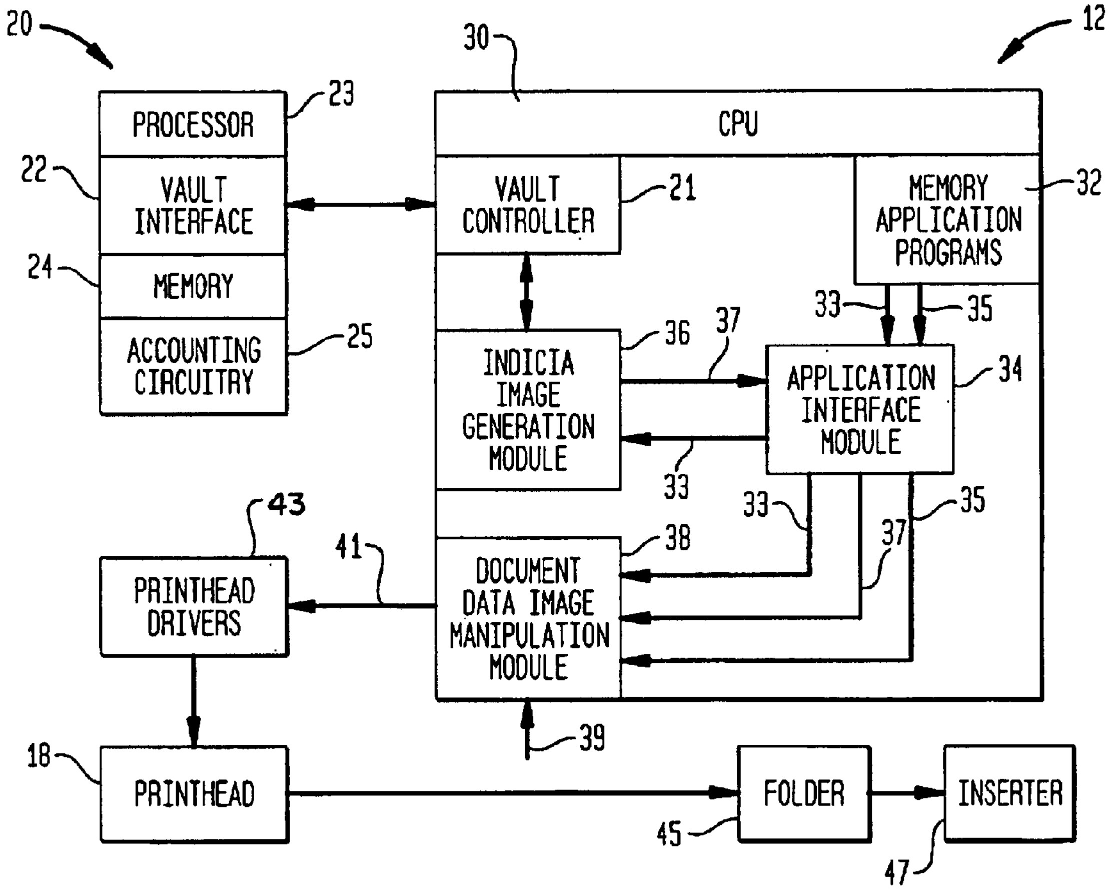
FIG. 2 is a block diagram of a portion of the postage metering system of FIG. 1.
Figure 3:
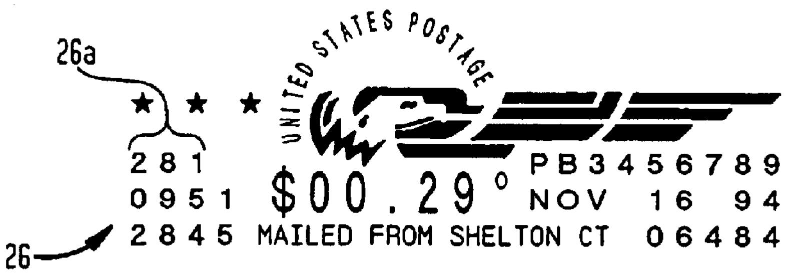
FIG. 3 shows a postal revenue block.

Referring to FIGS. 1 and 2, a PC metering system 10 in which the instant invention is implemented is shown. PC metering system 10 includes a conventional personal computer 12, a display 14, a keyboard 16, and a non-secure general purpose digital printer 18 which is preferably a laser or ink jet printer. PC metering system 10 further includes a removable electronic vault 20 (such as a Smart Card or PMCIA card) in which postage funds are stored and accounted for as postage is dispensed by PC metering system 10. In operation, an operator, via keyboard 16, initiates the printing of a desired amount of postage by the postage metering system 10. PC 12 sends the request for the printing of postage to vault 20 via its vault controller 21 and a vault controller interface 22 of vault 20. Vault 20, via its own processor 23 and programs stored in memory 24, then determines in a conventional manner if sufficient postage is available within conventional accounting circuitry 25 to accommodate the postage request. If sufficient postage is available, vault 20 reconciles the accounting within accounting circuitry 25 to account for the requested postage amount to be dispensed and provides a message to personal computer 12 authorizing the printing of the postage and providing digital tokens (or an encrypted message) uniquely associated with the instant postage transaction. Personal computer 12 then utilizes the digital token data received from the vault 20 to build an electronic image of a postal revenue block 26 having digital tokens **26*a* (see FIG. 3**). Further details of the specific components of the vault and personal computer in generating the postal revenue block, except for those set forth below, are not considered necessary for an understanding of the claimed invention and are therefore not presented herein. However, these components are further described in the aforementioned U.S. Pat. No. 5,781,438 and in copending U.S. patent application Ser. No. 08/575,112 which is incorporated herein by reference.

Referring specifically to FIG. 2, the personal computer 12 is controlled via a central processing unit 30. A memory 32 contains application programs such as word processing programs or other document producing programs which an operator can access via keyboard 16. The application programs 32 are used to create a document, such as a letter, in a conventional manner. However, in the instant invention, the application program 32 can be modified so that upon creation of a document and prior to printing, the operator can select the option of having an authenticated and accounted for postage revenue block 26 printed thereon.

Upon the selection of the postage option, a postage request message 33 is sent to an application interface module 34 together with the image data 35 for the created document. The application interface module 34 relays the postage request message 33 to an indicia image generation module 36 which requests, via vault controller 21, approval of the postage transaction and receipt of digital tokens from the vault 20 Once vault 20 has authorized the postage transaction, it sends a postage authorization signal to the indicia image generation module 36 together with the uniquely generated tokens for that transaction. The indicia image generation module 36 creates and sends bit map image data 37 of the postal revenue block 26 to application interface module 34. Application interface module 34 then sends the postage request message 33, the bit map image data 37, and the document image data 35 to a document image manipulation module 38. Document image manipulation module 38 receives the above-mentioned data together with secondary data 39 such as envelope dimensions with indicia window position, document fold type, document page orientation, fold orientation, and page size. This information is used to calculate the exact position within the document that the postal revenue block 26 is to be printed. Naturally, if the folded document is to be a self mailed product, information concerning the envelope is not required.

The secondary data 39 can be entered by a user via keyboard 16 in response to a prompt on display 14 or some of the data such as page size and page orientation can come directly from the application program that created the document together with the document image data 35. Once the location of the postal revenue block 26 within the document has been calculated, the document data image manipulation module 38 analyzes the document image data stream 35 and integrates the postal revenue block bit map image data 37 within the document image data stream 35. The integration of the postal revenue block bit map image data 37 and the document image data 35 is done in a manner so that a resulting bit map image of the document includes a postal revenue block 26 which is positioned within the document at a location that is dependent upon the secondary data. The integrated image data stream 41 is then sent to the drivers 43 of printer 18 which use the data stream 41 to print the document including the postal revenue block 26. Accordingly, for any number of mailpieces, the type of fold that the mailpieces will be subjected to can be specified and the postage metering system 10 will automatically, in real time, determine the proper location within the mailpiece that the postage revenue block 26 should be printed.

Figure 4:
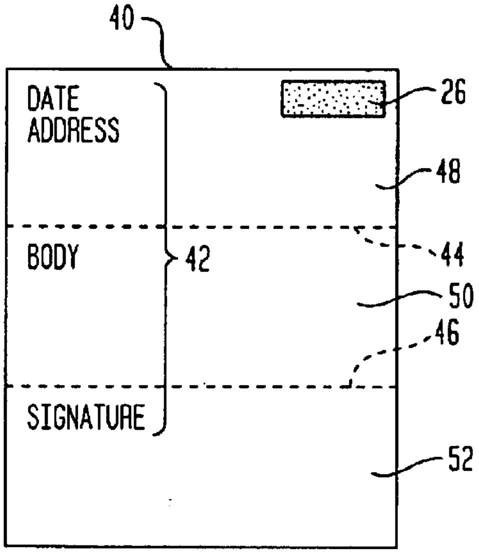
FIG. 4 shows a document with a postal revenue block which is set up to be subjected to a first type C Fold.
Figure 5:
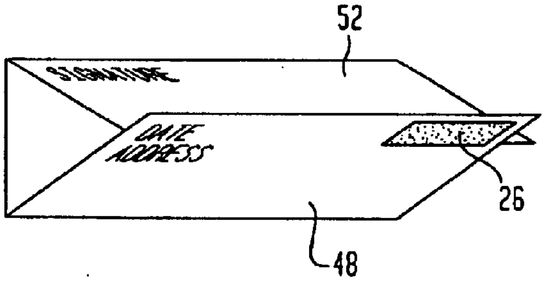
FIG. 5 shows the document of FIG. 4 in the first type C Fold configuration.

In order to more fully understand the invention described herein, reference is made to FIGS. 4 through 15. In FIG. 4, a document 40 is created using for example, a word processing program stored within application programs memory 32. The document 40 is an 8.5 by 11 inch sheet of paper but could be any other size. Document 40 includes written information 42 which in the embodiment of FIG. 4 is in the form of a letter having a date, address, body of the letter, and a signature block. Dashed lines 44, 46 represent horizontal fold lines where document 40 is folded to create a "C Fold" document as shown in FIG. 5. The fold lines 44, 46 also define top, middle, and bottom panels of the document 40 respectively designated 48, 50, and 52. It is to be noted that in the C Fold of FIG. 5, the top panel 48 is positioned on top of the folded document 40. Thus, when document 40 is to be subsequently placed in a conventional windowed envelope having a window in its upper right hand corner, the postage revenue block 26 must be printed in the upper right hand corner of top panel 48 in order to be seen through the window of the envelope.

Figure 6:
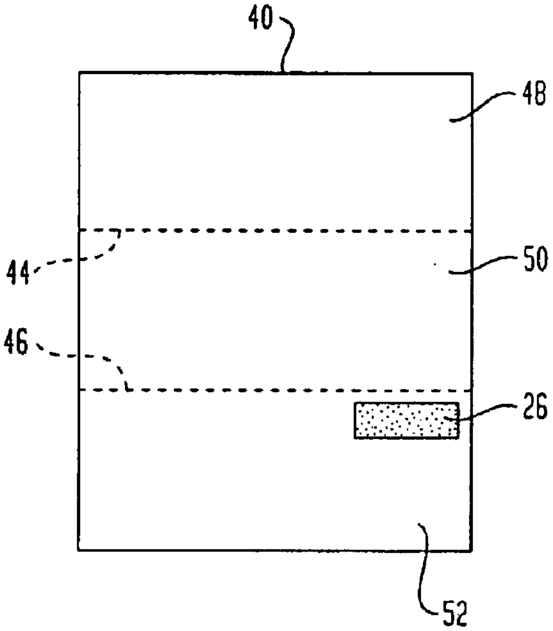
FIG. 6 shows a document with a postal revenue block which is set up to be subjected to a second type C Fold.
Figure 7:
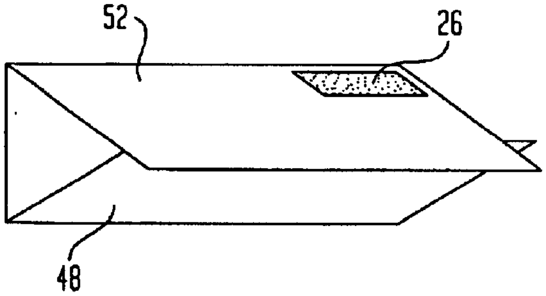
FIG. 7 shows the document of FIG. 6 in the second type C Fold configuration.

FIGS. 6 and 7 differ from FIGS. 4 and 5 in that the postage revenue block 26 needs to be printed in the upper right hand corner of bottom panel 52. This is because, as shown in FIG. 7, while a C Fold is still being used, the panels 48, 50, and 52 are folded such that the bottom panel 52 is now positioned on the top of the folded document 40. Therefore in order for the postal revenue block 26 to appear through the envelope window, the postal revenue block must be printed in the upper right hand corner of the bottom panel 52.

Figure 8:
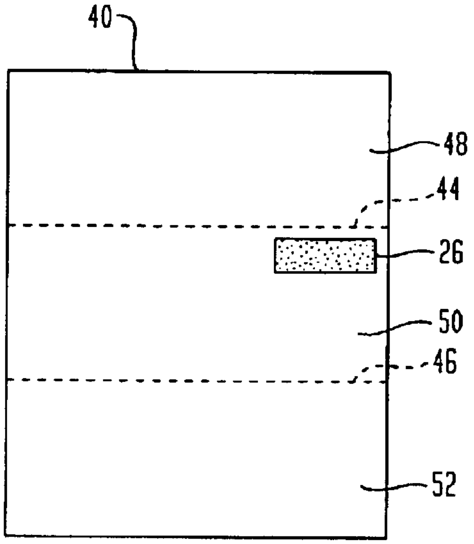
FIG. 8 shows a document with a postal revenue block which is set up to be subjected to a third type C Fold.
Figure 9:
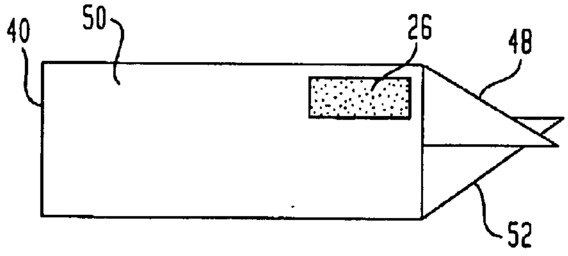
FIG. 9 shows the document of FIG. 8 in the third type C Fold configuration.

FIG. 8 shows another document 40 having a postal revenue block 26 printed in the upper right hand corner of the middle panel 50 to accommodate the type of C Fold shown in FIG. 9 in which the middle panel 50 ends up positioned on the top of the folded document 40.

Figure 10:
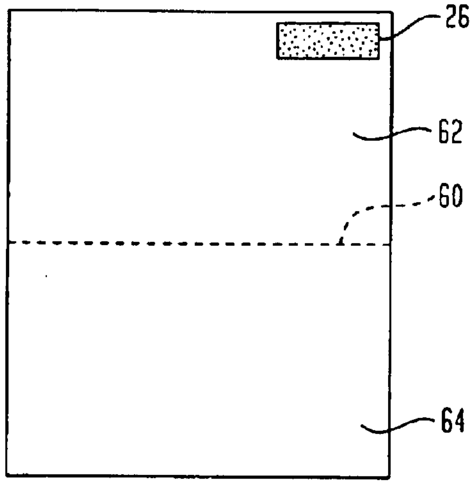
FIG. 10 shows a document with a postal revenue block which is set up to be subjected to a first type half fold configuration.
Figure 11:
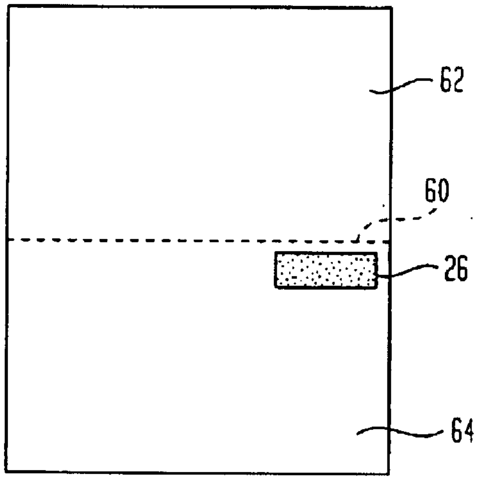
FIG. 11 shows a document with a postal revenue block which is set up to be subjected to a second type half fold configuration.

FIGS. 10 and 11 both show a document 40 having a single horizontal fold line 60 which divides the document into top and bottom panels 62 and 64, respectively. Both of these documents are folded along their respective fold line to create a one half fold document. In FIG. 10 the bottom panel 64 is folded upward behind the top panel 62 such that the postal revenue block 26 is required to be printed in the upper right hand corner of top panel 62. In contrast, in FIG. 11 the top panel 62 is folded down behind the bottom panel 64 such that the postal revenue block 26 must be printed in the upper right hand corner of the bottom panel 64.

Figure 12:
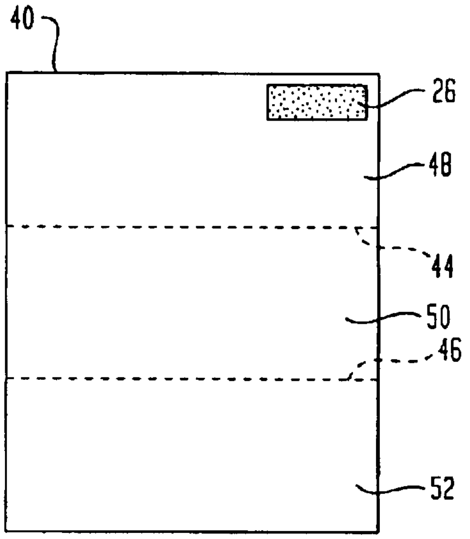
FIG. 12 shows a document with a postal revenue block which is set up to be subjected to a first type Z fold configuration.
Figure 14:
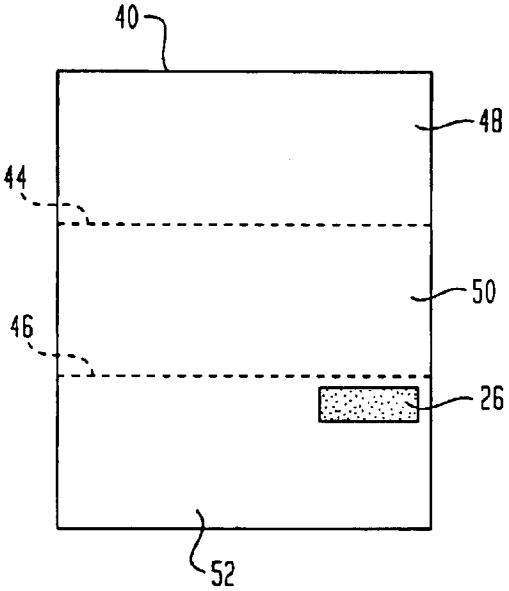
FIG. 14 shows a document with a postal revenue block which is set up to be subjected to a second type Z fold configuration.
Figure 13:
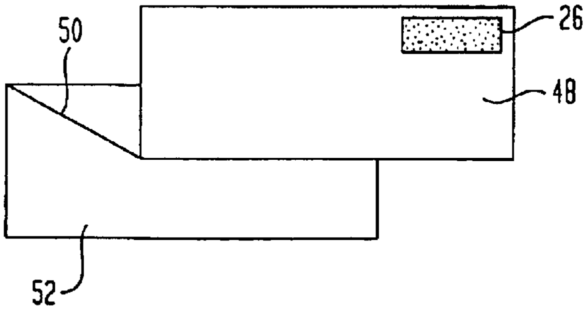
FIG. 13 shows the document of FIG. 12 in the first type Z Fold configuration.
Figure 15:
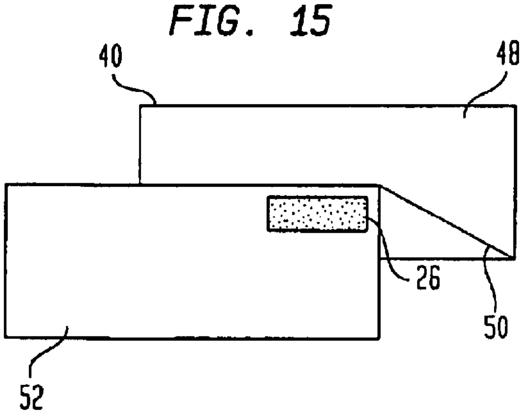
FIG. 15 shows the document of FIG. 14 in the second type Z Fold configuration.

FIG. 12 shows a document 40 having a postal revenue block 26 printed in the upper right hand corner of top panel 48. FIG. 13, shows the document 40 of FIG. 12 in a Z fold which requires the top panel 48 to be positioned on the top of the folded document 40. Conversely, FIG. 14 shows a document 40 having a postal revenue block 26 printed in the upper right hand corner of bottom panel 52 and FIG. 1 shows the document 40 of FIG. 3 in a Z Fold so that the bottom panel 52 ends up on top of the folded document.

FIGS. 4 through 15 show that the printing of the postal revenue block 26 on any document 40 will be dependent upon the type of fold that the document 40 will be subjected to after printing. While the above examples assume that the postal revenue block 26 should appear in the upper right hand corner of the folded document 40, one possessing ordinary skill in the art will recognize that deviations from this standard are possible depending upon specific postal regulations and the type of windowed envelope product or self mailed product being used.

Figure 16:
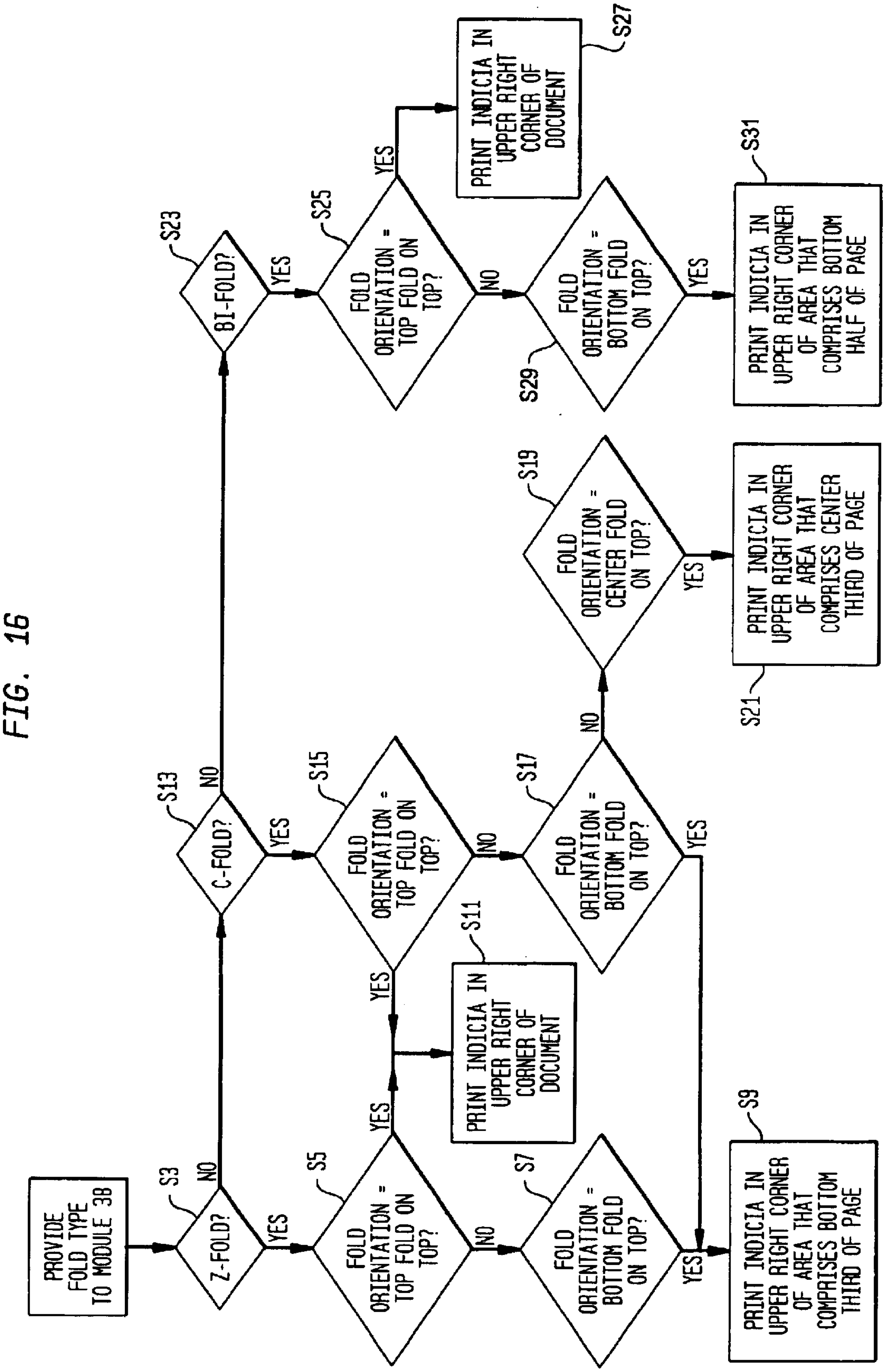
FIG. 16 is a flow chart of the process for determining a printing location within a document for a postal revenue block based on a selected fold type.

Referring to FIGS. 2 and 16 and as previously discussed, a user can enter information concerning the type of fold the document 40 will be subjected to via keyboard 16. This information is provided to document data image manipulation module 38 (step S1) which determines if a Z Fold has been requested (step S3). If the answer is YES, the program proceeds to step S5 where an inquiry is made as to whether the top panel 48 will be on top of the folded document 40. If the answer is NO, it is assumed that the bottom panel 52 is on top of the folded document 40 (step S7) and the determination is made that the postal revenue block 26 is to be printed in the upper right hand corner of the bottom panel 52 of document 40 (step S9). Returning to step S5 however, if the answer is YES, a determination is made that the postal revenue block 26 is to be printed in the upper right hand corner of the top panel 48 of document 40 (step S11).

In the event however that at step S3 the answer is NO, the program at step S13 queries as to whether a C Fold will be applied to the document 40. If the answer is YES, the program moves to step S15 and queries if the top panel 48 will be on top of the folded document 40. If the answer is YES, the determination is made at step S11 to print the postal revenue block 26 in the upper right hand corner of top panel 48 of document 40. Returning to step S15, if the answer is NO, an inquiry is made at step S17 to determine if the bottom panel 52 will be on top of folded document 40. If the answer is YES, the program proceeds to step S9 where it is determined that the postal revenue block 26 is to be printed in the upper right hand corner of bottom panel 48.

On the other hand, if the answer to the inquiry at step S17 is NO, it is determined that the middle panel 50 is on top of the folded document 40 (step S19) and the program proceeds to step S21 where it is determined that the postal revenue block should be printed in the upper right hand corner of the middle panel 50 of document 40.

At step S13 if the answer is NO the program assumes that a half fold will be applied to document 40 (step S23) and proceeds to step S25 to determine if the top panel 62 will be on top of the folded document 40. If the answer is YES at step S27 it is determined that the postal revenue block 26 should be printed in the upper right hand corner of the top panel 62. On the other hand, if the answer to the inquiry is NO, at step S29 it is assumed that the bottom panel 64 will appear at the top of the document 40 and at step S31 a decision is made to print the postal revenue block 26 in the upper right hand corner of the bottom panel 26.

Once the general position of the postal revenue block 26 has been determined by the document data image manipulation module 38, the secondary data 39 is used to identify the exact position within the document data image stream 35 where the postal revenue bit map image data 37 is to be integrated. One skilled in the art can readily program the document image manipulation module 38 to perform such integration based on the document image stream 35. That is, for example, if the document image data stream 35 is the result of a word processing program, the secondary data 39 can be utilized to precisely position the postal revenue block image data within the document image data stream 35.

Once the integrated image data stream 41 is completed, it is sent to the printhead drivers 43 which drive the printhead 18 to print the document 40 together with a properly positioned postal revenue block 26. Subsequent to printing, the document 40 can be manually folded in the selected fold configuration and placed in a windowed envelope so that the postal revenue block is visible through the envelope window. Alternatively, the document 40 can be fed in a conventional manner from the printing mechanism 18 to a conventional folder 45 which can be set up to perform the selected fold automatically. The folded document would be transported in a conventional manner to a known inserter 47 where it is inserted into the windowed envelope. The automatic folding 45 and inserter 47 mechanisms are disclosed in U.S. Pat. No. 5,628,249 which is hereby incorporated by reference.

As previously mentioned, the folded document does not have to be placed in a windowed envelope but can be sent directly into the mailstream as a self mailed mailpiece. In this scenario, the printed document is folded and then the folded document is secured in place such as by stapling or the application of a tab.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims Moreover, the term "evidence of postage" is meant to cover both a postage indicia and a postal revenue block.

What is claimed is:

1. A method of operating a processor based postage metering system having a program running on the processor based postage metering system, the program operable for controlling creation of a document by a user giving input data to the processor based postage metering system, the method comprising the steps of:

selecting a fold configuration for the document from a plurality of possible fold configurations;

identifying to the processor based postage metering system the selected fold configuration;

creating the document within the processor based postage metering system under control of the program;

within the processor based postage metering system automatically determining based on the selected fold configuration a designated location within the document for printing an evidence of postage; and printing the document and the evidence of postage such that the evidence of postage is printed in the designated location of the document.

2. A method as recited in claim 1, further comprising folding the printed document in the selected fold.

3. A method as recited in claim 2, further comprising inserting the folded printed document into an envelope having a window therein such that the evidence of postage is seen through the window.

4. A method as recited in claim 3, wherein during the selecting step one of a C Fold; a Z Fold, and a Half Fold is selected.

5. A method as recited in claim 2, further comprising preparing the folded document for entry into a mailstream by securing the folded document in place.

6. A method as recited in claim 1, wherein the automatic determination of the designated location is also based on secondary data.

7. A method as recited in claim 6, wherein the secondary data includes at least one of envelope dimensions including window position, document orientation, fold orientation, and document size.

8. A processor based postage metering system comprising:

means for entering user input data including a fold configuration selected from a plurality of fold configurations;

means for accounting for postage dispensed by the processor based postage metering system;

a document program running on the processor based postage metering system, the document program operable for controlling creation of a document based on the user input data;

means for automatically determining based on the fold configuration a designated location within the document for printing evidence of postage; and means for printing the document and the evidence of postage such that the evidence of postage is printed in the designated location of the document.

9. A processor based postage metering system as recited in claim 8, wherein the means for automatically determining determines the designated location based on the fold configuration and at least one of envelope dimensions including window position, document orientation, fold orientation, and document size.

* * * * *